United States Patent
Huang et al.

(10) Patent No.: US 12,517,295 B2
(45) Date of Patent: *Jan. 6, 2026

(54) DISPLAY AND FRONT LIGHT MODULE INCLUDING ENHANCEMENT LAYER

(71) Applicant: E Ink Holdings Inc., Hsinchu (TW)

(72) Inventors: Hsin-Tao Huang, Hsinchu (TW); Yu-Chuan Wen, Hsinchu (TW); Jen-Pin Yu, Hsinchu (TW); Ya-Chin Chang, Hsinchu (TW); Ching-Huan Liao, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/973,130

(22) Filed: Dec. 9, 2024

(65) Prior Publication Data
US 2025/0102723 A1 Mar. 27, 2025

Related U.S. Application Data

(63) Continuation-in-part of application No. 18/341,767, filed on Jun. 27, 2023, now Pat. No. 12,196,998.
(Continued)

(30) Foreign Application Priority Data

Dec. 12, 2022 (TW) .................................. 111147549

(51) Int. Cl.
*F21V 8/00* (2006.01)
(52) U.S. Cl.
CPC ........... *G02B 6/005* (2013.01); *G02B 6/0066* (2013.01); *G02B 6/0088* (2013.01)
(58) Field of Classification Search
CPC .......... B32B 17/10541; B32B 2255/10; B32B 2255/24; B32B 2551/00; B32B 27/08;
(Continued)

(56) References Cited

U.S. PATENT DOCUMENTS

2004/0022050 A1* 2/2004 Yamashita ........... G02B 6/0065
362/615
2015/0331176 A1 11/2015 Chen et al.
2021/0003766 A1* 1/2021 Rinko .................. G02B 6/0055

FOREIGN PATENT DOCUMENTS

TW 201312426 A 3/2013
TW M639895 U 4/2023
TW 202417957 A 5/2024

OTHER PUBLICATIONS

"Office Action of Taiwan counterpart Application", issued on Sep. 25, 2025, p. 1-p. 8.

* cited by examiner

*Primary Examiner* — Keith G. Delahoussaye
(74) *Attorney, Agent, or Firm* — JCIPRNET (57) ABSTRACT

A display includes a light guide plate, a first optical adhesive, a light source element, and a display panel. The light guide plate includes a light guide substrate and an enhancement layer disposed on the light guide substrate. At least a portion of the enhancement layer is interposed between a first surface of the light guide substrate and the first optical adhesive. A difference between the refractive index $n_1$ of the light guide substrate and the refractive index $n_2$ of the at least a portion of the enhancement layer is $\Delta n_1$. $\Delta n_1 = n_1 - n_2$. A difference between the refractive index $n_3$ of the first optical adhesive and the refractive index $n_2$ of the at least a portion of the enhancement layer is $\Delta n_2$. $\Delta n_2 = n_3 - n_2$, $\Delta n_1 \geq 0$, $\Delta n_2 \geq 0$, and $\Delta n_1 \geq \Delta n_2$.

16 Claims, 4 Drawing Sheets

Related U.S. Application Data

(60) Provisional application No. 63/419,302, filed on Oct. 25, 2022.

(58) Field of Classification Search
CPC .... G02B 6/005; G02B 6/0053; G02B 6/0063; G02B 6/0065; G02B 6/0093
USPC .................................................. 362/618, 622
See application file for complete search history.

DISPLAY AND FRONT LIGHT MODULE INCLUDING ENHANCEMENT LAYER

This application is a continuation-in-part application of and claims the priority benefit of a prior application Ser. No. 18/341,767, filed on Jun. 27, 2023, which claims the priority benefit of U.S. provisional application Ser. No. 63/419,302, filed on Oct. 25, 2022 and Taiwan application serial no. 111147549, filed on Dec. 12, 2022. The entirety of each of the above-mentioned patent applications is hereby incorporated by reference herein and made a part of this specification.

BACKGROUND

Technical Field

The disclosure relates to an electronic device, and particularly relates to a display.

Description of Related Art

Display has been widely used in various devices and fields. Therefore, the design of display faces various problems and needs to be improved due to different application methods. Taking the light source device in the display as an example, in order to achieve a uniform light source, a light guide plate has to be disposed in the light source device to guide the light distribution. In some applications, if the product is required to be flexible or used in a non-planar environment, the light guide plate has to further overcome the problem of damage caused by bending. Therefore, the improvement of display components has not stopped.

SUMMARY

The disclosure provides a display with good optical performance.

The display in an embodiment of the disclosure includes a light guide plate, a first optical adhesive, a light source element, and a display panel. The light guide plate includes a light guide substrate and an enhancement layer. The light guide substrate has a light incident surface, a first surface, and a second surface. The first surface is opposite to the second surface, and the light incident surface extends between the first surface and the second surface. The enhancement layer is disposed on the light guide substrate. The first optical adhesive is disposed on the light guide substrate. At least a portion of the enhancement layer is interposed between the first surface of the light guide substrate and the first optical adhesive. The light source element is arranged next to the light incident surface and emits light toward the light incident surface. The display panel faces the second surface of the light guide substrate. The refractive index of the light guide substrate is $n_1$. The refractive index of at least a portion of the enhancement layer is $n_2$. The refractive index of the first optical adhesive is $n_3$. The difference between the refractive index of the light guide substrate and the refractive index of the at least a portion of the enhancement layer is $\Delta n_1$. $\Delta n_1 = n_1 - n_2$. The difference between the refractive index of the first optical adhesive and the refractive index of the at least a portion of the enhancement layer is $\Delta n_2$.

$$\Delta n_2 = n_3 - n_2, \Delta n_1 \geq 0, \Delta n_2 \geq 0, \text{ and } \Delta n_1 \geq \Delta n_2.$$

The front light module according to an embodiment of the disclosure includes a light guide plate and a first optical adhesive. The light guide plate includes a light guide substrate and an enhancement layer. The light guide substrate has a light incident surface, a first surface, and a second surface. The first surface is opposite to the second surface, and the light incident surface extends between the first surface and the second surface. The enhancement layer is disposed on the light guide substrate. The first optical adhesive is disposed on the light guide substrate. At least a portion of the enhancement layer is interposed between the first surface of the light guide substrate and the first optical adhesive. The refractive index of the light guide substrate is $n_1$. The refractive index of at least a portion of the enhancement layer is $n_2$. The refractive index of the first optical adhesive is $n_3$. $\Delta n_1 > \Delta n_3 > \Delta n_2$. The thickness of the enhancement layer is less than the thickness of the light guide substrate, and the thickness of the enhancement layer is less than the thickness of the first optical adhesive.

Based on the above, the display of the embodiments of the disclosure uses the light guide plate with the enhancement layer. The light guide plate includes multiple layers of structures. By properly designing the refractive index difference between the multiple layers of structures, the optical performance of the display can be optimized.

DESCRIPTION OF THE EMBODIMENTS

Figure 1A:
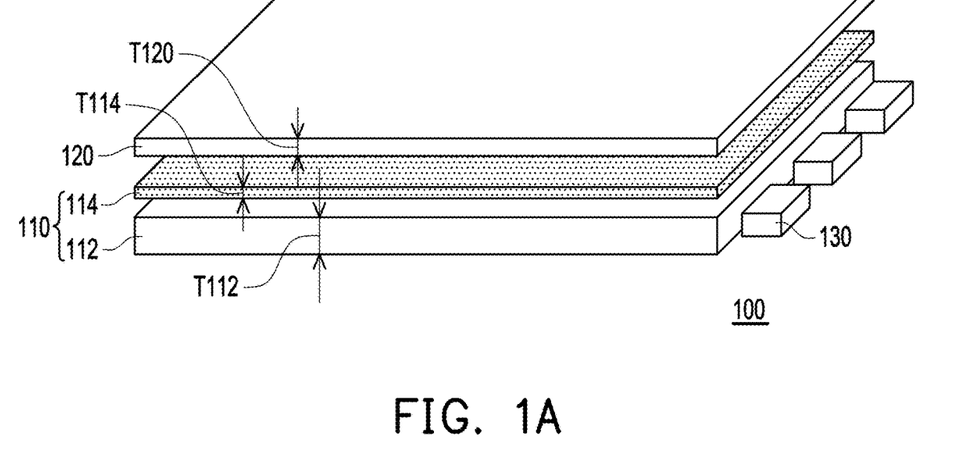
FIG. 1A is a schematic exploded view of a light source device according to an embodiment of the disclosure.
Figure 1B:
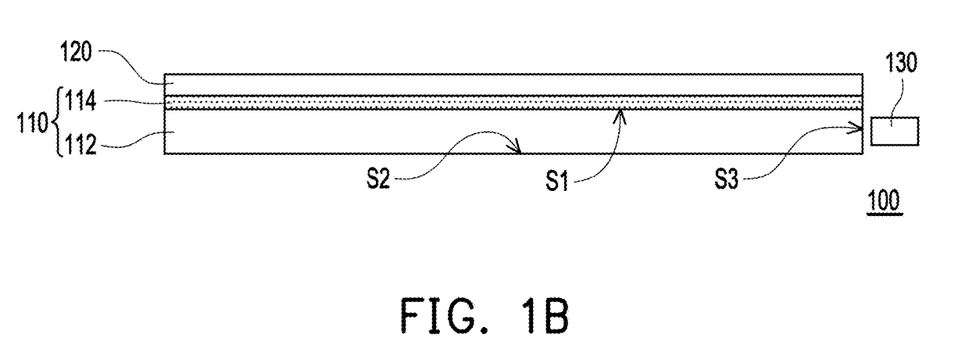
FIG. 1B is a schematic side view of the light source device in FIG. 1A.

FIG. 1A is a schematic exploded view of a light source device according to an embodiment of the disclosure, and FIG. 1B is a schematic side view of the light source device in FIG. 1A. Referring to FIG. 1A together with FIG. 1B, a light source device 100 includes a light guide plate 110, a first optical adhesive 120, and a light source element 130. The light guide plate 110 includes a light guide substrate 112 and an enhancement layer 114. The enhancement layer 114 is disposed on the light guide substrate 112. The first optical adhesive 120 is disposed on the light guide plate 110 and is used to attach other components (not shown). The light guide substrate 112 of the light guide plate 110 has a first surface S1, a second surface S2, and a light incident surface S3, in which the first surface S1 is opposite to the second surface S2, and the light incident surface S3 extends between the first surface S1 and the second surface S2. In this embodiment, at least a portion of the enhancement layer 114 is interposed between the first surface S1 of the light guide substrate 112 and the first optical adhesive 120. In addition, the light source element 130 is arranged next to the light incident surface S3 and emits light toward the light incident surface S3.

In some embodiments, the first optical adhesive 120 (optical clear adhesive, OCA; or optical clear resin, OCR) is a solid sheet-like adhesive material with good light transmittance, which has properties similar to double-sided tape to attach components thereabove and therebelow. In some embodiments, a thickness T120 of the first optical adhesive 120 is approximately 25 microns to 250 microns. When the first optical adhesive 120 and the light guide substrate 112 are both solid materials and have a certain thickness, the adhesion between the two components is not very stable and the components are easily delaminated from each other. In this embodiment, the enhancement layer 114 is disposed between the first optical adhesive 120 and the light guide substrate 112, which helps strengthen the adhesion between the components. Therefore, the light guide plate 110 and the first optical adhesive 120 are not easily delaminated from each other, which helps maintain the lifetime of the light source device 100.

In some embodiments, the light source element 130 includes a light emitting diode. For example, the light source device 100 may include a plurality of light source elements 130 and the plurality of light source elements 130 may be arranged at intervals next to the light incident surface S3 of the light guide substrate 112. The light source element 130 may be oriented with the light emitting surface facing the light incident surface S3, thereby emitting light toward the light incident surface S3. The light guide plate 110 can guide the point-distributed light sources provided by the multiple light source elements 130 into a surface light source for use in the final product (for example, as a light source for a display).

The light guide substrate 112 is, for example, a flat-plate component. The first surface S1 and the second surface S2 refer to two surfaces that are parallel to the plane of the plate and have normal directions substantially parallel, and the light incident surface S3 may be a portion of the side surface surrounding the periphery of the plate. In this embodiment, taking the light guide substrate 112 as a rectangular flat plate as an example, the light incident surface S3 may be one of the four side surfaces. In some embodiments, the light incident surface S3 may be two or more of the four side surfaces. That is, in some embodiments, the light source element 130 may be arranged next to multiple side surfaces of the light guide substrate 112. In this way, either the side surface corresponding to the light source element 130, or the side surface receiving the light emitted by the light source element 130, may be used as the light incident surface S3. Therefore, the manner in which one of the side surfaces is used as the light incident surface S3 in FIG. 1A and FIG. 1B is merely for illustration.

The material of the light guide substrate 112 may include polymethyl methacrylate (PMMA) or polycarbonate (PC), but the disclosure is not limited thereto. A thickness T112 of the light guide substrate 112 is approximately several millimeters to more than ten millimeters, such as 2 millimeters to 15 millimeters, but the disclosure is not limited thereto. In an embodiment, the enhancement layer 114 may be a coating-type enhancement layer, for example, formed on the light guide substrate 112 through a coating process. A thickness T114 of the enhancement layer 114 may be significantly smaller than the thickness T112 of the light guide substrate 112, and the thickness T114 of the enhancement layer 114 is also smaller than a thickness T120 of the first optical adhesive 120. For example, the thickness T114 of the enhancement layer 114 is in a range of 1 micron to 25 microns. Therefore, the enhancement layer 114 is a thin coating formed on the light guide substrate 112, and the thickness is not significant in the overall light source device 100. In addition, in some embodiments, the enhancement layer 114 may have microstructures through control and adjustment of the coating process. For example, the coating rate of the enhancement layer 114 may be controlled to form thicker sections in certain areas and thinner sections in certain areas, thereby defining the microstructure in the final enhancement layer 114.

Both the light guide substrate 112 and the enhancement layer 114 have good light transmission and can allow most visible light to pass through. Therefore, the light guide plate 110 may transmit the light emitted by the light source element 130 without causing significant light loss. In addition, the refractive index of the light guide substrate 112 is greater than the refractive index of the enhancement layer 114. In this embodiment, the refractive index of the light guide substrate 112 may be 1.58 to 1.6 (the material is PC) or 1.48 to 1.5 (the material is PMMA), and the refractive index of the enhancement layer 114 may be 1.3 to 1.48, but the disclosure is not limited thereto. The light emitted by the light source element 130 may travel within the light guide substrate 112 after entering the light guide substrate 112 from the light incident surface S3. Since the refractive index of the light guide substrate 112 is greater than the refractive index of the enhancement layer 114, the oblique light may be totally reflected at the interface between the first surface S1 of the light guide substrate 112 and the enhancement layer 114 and travel toward the second surface S2, so that the light shines on the components facing the second surface S2 (such as the display panel). In this way, the light source device 100 may be used in a display to provide the light source required by the display as a light source module.

In addition, the refractive index of the first optical adhesive 120 may be greater than the refractive index of the enhancement layer 114, so the light passing through the enhancement layer 114 may pass through the first optical adhesive 120 without being reflected back into the light guide plate 110, which helps improve light utilization. In some embodiments, since the enhancement layer 114 exists between the light guide substrate 112 and the first optical adhesive 120, the first optical adhesive 120 does not need to be limited to selecting a material with a smaller refractive index, which helps increase the flexibility of material selection for the first optical adhesive 120. For example, the refractive index of the first optical adhesive 120 may be greater than 1.45.

In some embodiments, the material of the enhancement layer 114 may be photo-crosslinked resin. In some embodiments, the material of the enhancement layer 114 may include a functional polymer, in which the functional polymer may include an acrylate polymer; a block polymer; an oligomer, polymer, or hyperbranched polymer with fluoroacrylate; a silicone modified oligomer, polymer, or hyperbranched polymer; acrylated epoxy resin; acrylic polyurethane; aliphatic Acrylated urethanes; aromatic Acrylated urethanes; or a combination of the above. In some embodiments, the functional polymer of the enhancement layer 114 may be in a range of 0 wt % to 60 wt %.

In some embodiments, the material of the enhancement layer 114 may include a functional monomers, in which the functional monomer may include a monofunctional or polyfunctional monomer. In some embodiments, the monomer as the functional monomer may include a monofunctional or polyfunctional acrylate monomer; a fluoroacrylate monomer; a silicon modified acrylate monomer; or a combination of the above. In some embodiments, the proportion of the functional monomer in the enhancement layer 114 may be in a range of 10 wt % to 99 wt %.

In some embodiments, the material of the enhancement layer 114 may include a photoinitiator, in which the photoinitiator may be a single component or multiple components. For example, a photoinitiator generates free radicals after being irradiated with light, and reacts through the free radicals. The photoinitiator may be a hydroxyketone type photoinitiator such as Irgacure® 184 or acylphosphine oxide type photoinitiator such as Irgacure® TPO. In some embodiments, the proportion of the photoinitiator in the enhancement layer 114 may be in a range of 0.01 wt % to 5 wt %.

In some embodiments, the enhancement layer 114 includes fillers, in which the fillers include organic particles, inorganic particles, or a combination thereof. The organic particles include, for example, silicon polymers. The inorganic particles include, for example, nanometal particles, such as nanoparticles made of materials like ZnO, $TiO_2$, $SiO_2$, and $MgF_2$. In some embodiments, the material of the enhancement layer 114 may include additives such as dye or pigment, optical brightener, microcapsules, light stabilizer, thickener, and leveling agent. The additives and/or the fillers in the enhancement layer 114 may be in a range of approximately 0.01 wt % to 15 wt %.

In some embodiments, the material of the enhancement layer 114 may include a solvent or may be a solvent-free material. The solvent used to form the enhancement layer 114 may be, for example, isopropyl alcohol (IPA), ethanol (EtOH), methyl ethyl ketone (MEK), acetone, toluene, ethyl acetate (EA), tetrahydrofuran (THF), and dimethylacetamide (DMAC). The solvent in the enhancement layer 114 may be in a range of approximately 0 wt % to 50 wt %.

The material of the enhancement layer 114 may be adjusted based on different needs. In some embodiments, when the material of the enhancement layer 114 includes fillers such as a silicon modified acrylate monomer, oligomer, or polymer; or silicon polymers, $SiO_2$ particles, or nanometal particles, and the like, the enhancement layer 114 may have water resistance properties. In some embodiments, when the material of the enhancement layer 114 includes fillers such as an acrylate monomer, oligomer, or polymer; acrylic epoxy resin or acrylic polyurethane (aliphatic and aromatic); or silicon polymers, $SiO_2$ particles, or nanometal particles, and the like, the enhancement layer 114 may have good chemical resistance. In some embodiments, when the material of the enhancement layer 114 includes fillers such as an acrylate monomer, oligomer, or polymer; acrylic epoxy resin; acrylic polyurethane; grafted polymer; or silicon polymers, $SiO_2$ particles, or nanometal particles, and the like, the enhancement layer 114 has good scratch resistance. In some embodiments, when the material of the enhancement layer 114 is added with fillers such as nanometals or ultraviolet (UV) inhibitors, the enhancement layer 114 has UV protection properties. In some embodiments, when the material of the enhancement layer 114 is added with fillers such as block polymers or microcapsules, the enhancement layer 114 has self-healing properties. The term self-healing means that when the enhancement layer 114 is subjected to external forces (such as bending or flexing, for example, in the states shown in FIG. 1C and FIG. 1D) and cracks are generated, the additives can assist in filling the cracks to achieve self-healing, which helps maintain the lifetime of the light guide plate 110. Therefore, the light guide plate 110 has flexibility tolerance and can be applied to flexible products or curved (non-planar) products. However, the above descriptions of individual characteristics and materials are merely examples, and the disclosure is not limited thereto.

Figure 2:
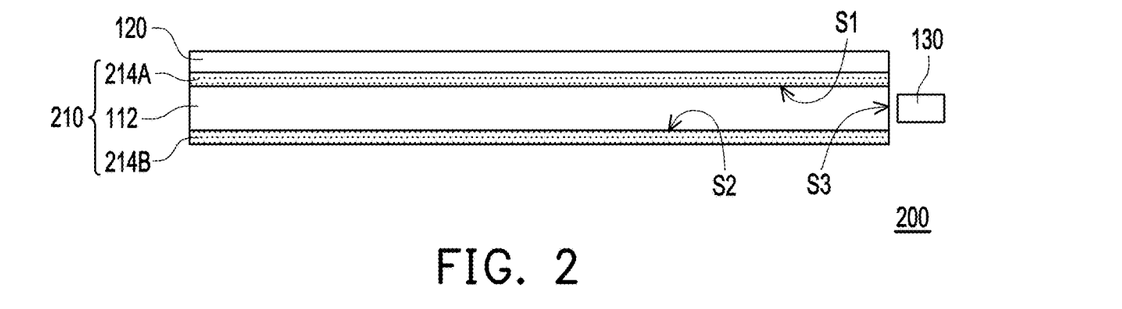
FIG. 2 is a schematic side view of a light source device according to an embodiment of the disclosure.

FIG. 2 is a schematic side view of a light source device according to an embodiment of the disclosure. In FIG. 2, a light source device 200 includes a light guide plate 210, the first optical adhesive 120, and the light source element 130, in which the light guide plate 210 includes the light guide substrate 112 and an enhancement layer 214. The first optical adhesive 120, the light source element 130, and the light guide substrate 112 in FIG. 2 are substantially the same as the first optical adhesive 120, the light source element 130, and the light guide substrate 112 in FIG. 1A and FIG. 1B. Therefore, the descriptions of the elements in the two embodiments may be referred to each other and applied to each other. Specifically, this embodiment is different from the embodiments of FIG. 1A and FIG. 1B mainly in that, in addition to being disposed on the first surface S1 of the first optical adhesive 120 and the light guide substrate 112, the enhancement layer 214 further covers the second surface S2 of the light guide substrate 112. For convenience of explanation, the description divides the parts of the enhancement layer 214 covering different surfaces into a first sub-layer 214A and a second sub-layer 214B. The first sub-layer 214A covers the first surface S1 of the light guide substrate 112, and the second sub-layer 214B covers the second surface S2 of the light guide substrate 112. The first sub-layer 214A is substantially the same as the enhancement layer 114 in FIG. 1A and FIG. 1B. The material and properties of the first sub-layer 214A and the second sub-layer 214B may be the same as the enhancement layer 114 in FIG. 1A and FIG. 1B. For example, the refractive index of the first sub-layer 214A and the second sub-layer 214B may be in a range of 1.3 to 1.48, the thickness of the first sub-layer 214A and the second sub-layer 214B may be in a range of 1 micron to 25 microns, and the materials of the first sub-layer 214A and the second sub-layer 214B may be selected from the foregoing materials of the enhancement layer 114.

Figure 3A:
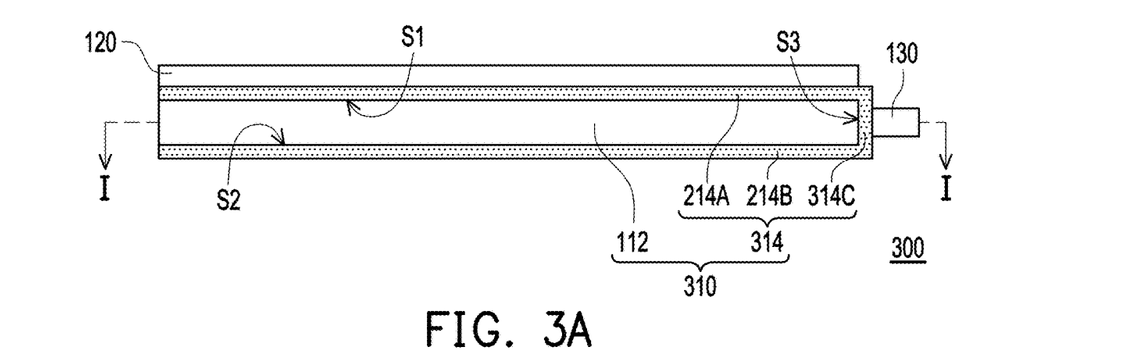
FIG. 3A is a schematic side view of a light source device according to an embodiment of the disclosure.
Figure 3B:
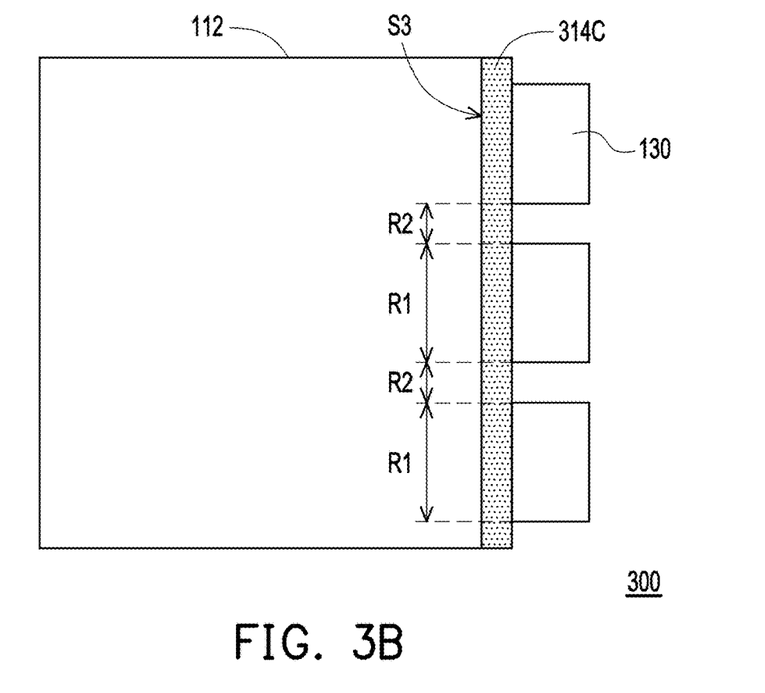
FIG. 3B is a schematic cross-sectional view of the light source device along a line I-I in FIG. 3A.

FIG. 3A is a schematic side view of a light source device according to an embodiment of the disclosure, and FIG. 3B is a schematic cross-sectional view of the light source device along a line I-I in FIG. 3A. In FIG. 3A and FIG. 3B, a light source device 300 includes a light guide plate 310, the first optical adhesive 120, and the light source element 130, in which the light guide plate 310 includes the light guide substrate 112 and an enhancement layer 314. The light source device 300 is generally similar to the light source device 200. Therefore, the same reference signs in the two embodiments may represent the same elements, and the descriptions of the same elements in the two embodiments may be referred to each other. Specifically, the light source device 300 is different from the light source device 200 mainly in that, the coating-type enhancement layer 314 further covers the light incident surface S3, so that the coating-type enhancement layer 314 is interposed between the light incident surface S3 and the light source element 130. In other words, the coating-type enhancement layer 314 includes the first sub-layer 214A covering the first surface S1, the second sub-layer 214B covering the second surface S2, and a third sub-layer 314C covering the light incident surface S3, in which the description of the first sub-layer 214A and the second sub-layer 214B may refer to the relevant description of FIG. 2. The third sub-layer 314C may completely cover the light incident surface S3. In some embodiments, the third sub-layer 314C may be continuously connected between the first sub-layer 214A and the second sub-layer 214B, but the disclosure is not limited thereto. In some embodiments, adjacent ones of the first sub-layer 214A, the second sub-layer 214B, and the third sub-layer 314C may be disconnected from each other and not continuous.

The third sub-layer 314C of the coating-type enhancement layer 314 is an intermediary layer between the light source element 130 and the light incident surface S3. The light emitted by the light source element 130 may be scattered and refracted by the third sub-layer 314C before reaching the light incident surface S3, which helps evenly distribute the light in advance before entering the light guide substrate 112. For example, as shown in FIG. 3B, the light source device 300 includes multiple light source elements 130 and the light source elements 130 are arranged at intervals. Therefore, the light source element 130 does not provide a continuous light source distributed along the light incident surface S3. Specifically, the light incident surface S3 of the light guide substrate 112 includes a section R1 overlapping the light source element 130 and a section R2 not overlapping the light source element 130. Due to the arrangement at intervals of the light source element 130, the light emitted by the light source element 130 is mainly distributed in the section R1, causing the section R2 to receive relatively less light, which may cause significant brightness difference between the section R1 and the section R2. However, in this embodiment, the third sub-layer 314C may provide effects such as refraction and scattering to adjust the distribution of the light emitted by the light source element 130, so that the light may be evenly distributed in the third sub-layer 314C in advance before entering the light guide substrate 112 through the light entry surface S3. In this way, the brightness difference between the section R1 and the section R2 can be mitigated, resulting in a more uniform light distribution. Since the refractive index of the third sub-layer 314C (same as the description of the enhancement layer 114 in FIG. 1A and FIG. 1B) is smaller than the refractive index of the light guide substrate 112, the light is not totally reflected at the interface between the third sub-layer 314C and the light incident surface S3, but can mostly enter the light guide substrate 112 without causing light loss. Therefore, the light source device 300 can provide uniform lighting effects and ideal light utilization.

Figure 4:
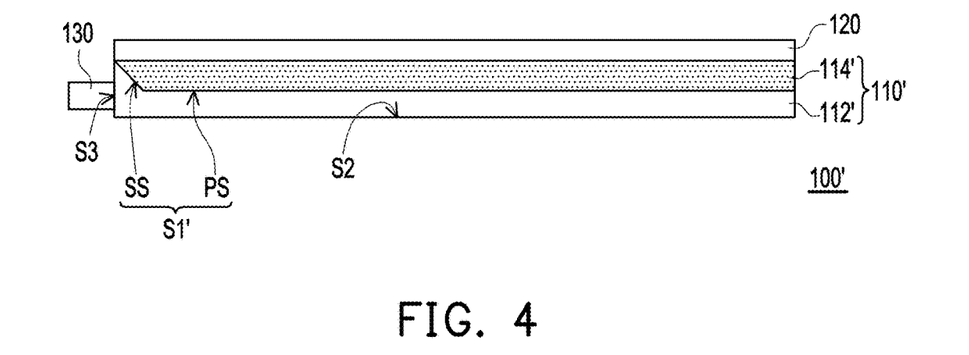
FIG. 4 is a schematic side view of a light source device according to an embodiment of the disclosure.

FIG. 4 is a schematic side view of a light source device according to an embodiment of the disclosure. In FIG. 4, a light source device 100' is generally similar to the light source device 100 of FIG. 1A and FIG. 1B, in which the light source device 100' includes a light guide plate 110', the first optical adhesive 120, and the light source element 130. For the descriptions of the first optical adhesive 120 and the light source element 130, reference may be made to FIG. 1A and FIG. 1B, so details will not be repeated here. In this embodiment, the light guide plate 110' is different from the light guide plate 110 of FIG. 1A and FIG. 1B mainly in that, the light guide plate 110' includes a light guide substrate 112' and an enhancement layer 114', and the shape of the light guide substrate 112' is different from the light guide substrate 112. Specifically, the light guide substrate 112' has a first surface S1', the second surface S2, and the light incident surface S3. The enhancement layer 114' is disposed on the first surface S1', and the light source element 130 faces the light incident surface S3. The first surface S1' of the light guide substrate 112' has an inclined section SS and a planar section PS, and the inclined section SS is between the light incident surface S3 and the planar section PS.

In this embodiment, the thickness of the light guide substrate 112' remains substantially constant in the planar section PS, and gradually increases in the inclined section SS toward the light incident surface S3. Therefore, the light guide substrate 112' has a wedge-shaped structure near the light incident surface S3 while having a thinned thickness away from the light incident surface S3. In some embodiments, the thickness variation of the light guide substrate 112' may be in a range of 5 microns to 250 microns. The enhancement layer 114' is conformably disposed on the first surface S1' and also has a varying thickness to compensate for the thickness variation of the light guide substrate 112', so that the light guide plate 110' has a substantially equal thickness structure. In this way, the first optical adhesive 120 may be disposed on the flat surface formed by the enhancement layer 114', which helps ensure the attachment stability of the first optical adhesive 120.

Figure 5:
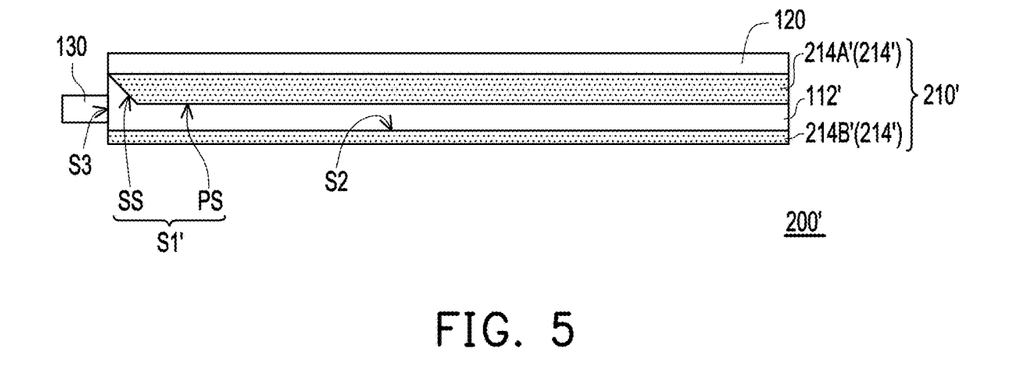
FIG. 5 is a schematic side view of a light source device according to an embodiment of the disclosure.

FIG. 5 is a schematic side view of a light source device according to an embodiment of the disclosure. In FIG. 4, a light source device 200' is generally similar to the light source device 200 of FIG. 2, in which the light source device 200' includes a light guide plate 210', the first optical adhesive 120, and the light source element 130. For the descriptions of the first optical adhesive 120 and the light source element 130, reference may be made to FIG. 1A and FIG. 1B, so details will not be repeated here. In this embodiment, the light guide plate 210' is different from the light guide plate 210 in FIG. 2 mainly in that, the light guide plate 210' includes a light guide substrate 112' and an enhancement layer 214', and the shape of the light guide substrate 112' is different from the light guide substrate 112. Specifically, the light guide substrate 112' has the first surface S1', the second surface S2, and the light incident surface S3. The enhancement layer 214' includes a first sub-layer 214A' disposed on the first surface S1' and a second sub-layer 214B disposed on the second surface S2, and the light source element 130 is arranged next to the light incident surface S3 to emit light toward the light incident surface S3.

In this embodiment, the first surface S1' of the light guide substrate 112' has the inclined section SS and the planar section PS, and the inclined section SS is between the light incident surface S3 and the planar section PS. The thickness of the light guide substrate 112' remains substantially constant in the planar section PS, and gradually increases in the inclined section SS toward the light incident surface S3. Therefore, the light guide substrate 112' has a wedge-shaped structure near the light incident surface S3. The first sub-layer 214A' of the enhancement layer 214' disposed on the first surface S1' also has a varying thickness to compensate for the thickness variation of the light guide substrate 112', so that the light guide plate 210' has a substantially equal thickness structure. In this way, the first optical adhesive 120 may be disposed on the flat surface formed by the first sub-layer 214A', which helps ensure the attachment stability of the first optical adhesive 120. In other embodiments, the light guide substrate 112' with the wedge-shaped structure and the first sub-layer 214A' with the varying thickness may be applied to the light source device 300 of FIG. 3A to replace the light guide substrate 112 and the first sub-layer 214A' of FIG. 3A, which helps reduce the overall thickness of the product.

Figure 6:
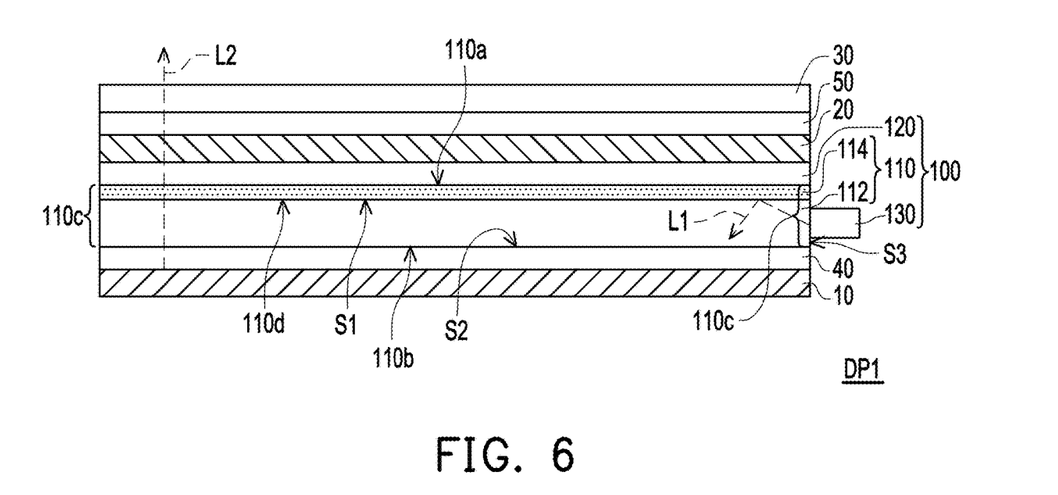
FIG. 6 is a schematic side view of a display according to an embodiment of the disclosure.

FIG. 6 is a schematic side view of a display according to an embodiment of the disclosure. In FIG. 6, a display DP1 mainly includes the light guide plate 110, the first optical adhesive 120, the light source element 130, a display panel 10, a touch panel 20, a cover plate 30 and other second optical adhesive 40 and third optical adhesive 50, in which the light guide plate 110, the first optical adhesive 120, and the light source element 130 may form the light source device 100. Therefore, for the specific features of the light source device 100, reference may be made to the description of the foregoing embodiments. The display panel 10 may be attached to the light guide plate 110 through the second optical adhesive 40, the touch panel 20 may be attached to the light guide plate 110 through the first optical adhesive 120, and the display panel 10 and the touch panel 20 are on opposite sides of the light guide plate 110. The cover plate 30 is attached to the touch panel 20 through the third optical adhesive 50. The cover plate 30 is, for example, a light-transmissive plate-shaped component, which may have appropriate mechanical strength to protect the display DP1.

In this embodiment, the display panel 10 is, for example, a reflective display panel. After the light source provided by the light source device 100 shines on the display panel 10, the light source is reflected by the display panel 10, passes through the light guide plate 110, the touch panel 20, and the cover plate 30, and then is emitted by the cover plate 30 to display an image. Therefore, the light source device 100 is a front light source module disposed between a user who viewing the displayed image and the display panel 10 (may also be understood as being in front of the display panel 10). In addition, the light guide plate 110 may evenly provide the light emitted by the light source element 130 to the display panel 10 and allow the light reflected by the display panel 10 to pass through, thereby realizing the display function.

The light guide plate 110 includes the light guide substrate 112 and the enhancement layer 114, in which the light guide substrate 112 has the first surface S1, the second surface S2, and the light incident surface S3, and the first surface S1 and the second surface S2 are on opposite sides of the light incident surface S3. The enhancement layer 114 covers the first surface S1 and is between the light guide substrate 112 and the first optical adhesive 120. The thickness of the enhancement layer 114 is in a range of 1 micron to 25 microns, and the refractive index of the light guide substrate 112 is greater than the refractive index of the enhancement layer 114. In addition, in some embodiments, the light guide substrate 112 and the enhancement layer 114 may be implemented using the light guide substrate 112' and the enhancement layer 114' in FIG. 4.

The light source element 130 is arranged next to the light incident surface S3 and emits light toward the light incident surface S3. The display panel 10 faces the second surface S2 of the light guide substrate 112, and the display panel 10 is attached to the second surface S2 of the light guide substrate 112 through, for example, the second optical adhesive 40. In addition, the touch panel 20 may be attached to the coating-type enhancement layer 114 on the first surface S1 of the light guide substrate 112 through the first optical adhesive 120. The light emitted by the light source element 130 enters the light guide substrate 112 from the light incident surface S3 and may travel within the light guide substrate 112 and be distributed into a surface light source. For example, the light L1 that is obliquely shined on the first surface S1 may be reflected and turned toward the second surface S2 to shine on the display panel 10 based on the refractive index relationship between the enhancement layer 114 and the light guide substrate 112. Therefore, the enhancement layer 114 helps increase the amount of light emitted by the light source element 130 reaching the display panel 10, that is, the light utilization of the light source device 100 is improved.

In addition, the light L2 reflected by the display panel 10 may sequentially pass through the light guide plate 110, the first optical adhesive 120, the touch panel 20, the third optical adhesive 50, and the cover plate 30 display the image. In this embodiment, the refractive index of the first optical adhesive 120 may be greater than the refractive index of the enhancement layer 114, so the light L2 is not easily reflected at the interface between the first optical adhesive 120 and the enhancement layer 114, which allows the light L2 with display information to be sent out efficiently and helps improve display contrast. In addition, the material of the first optical adhesive 120 does not need to be limited to a material with a lower refractive index, which helps increase the flexibility of material selection. In some embodiments, the refractive index of the first optical adhesive 120 may be greater than 1.45.

Figure 1C:
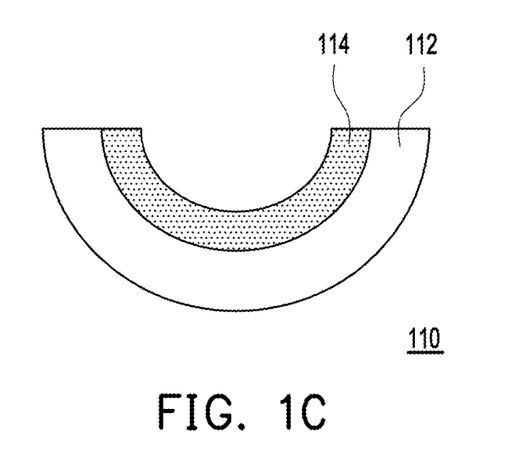
FIG. 1C and FIG. 1D schematically show bent states of a light guide plate 110 in FIG. 1A.
Figure 1D:
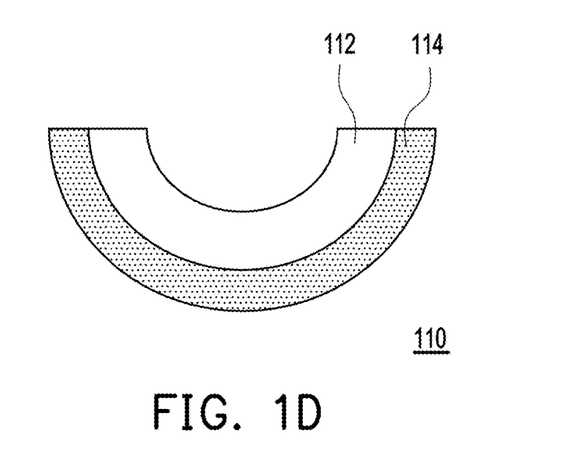

In this embodiment, the material that may be selected for the enhancement layer 114 is as the material described in the embodiments of FIG. 1A and FIG. 1B. The enhancement layer 114 may achieve various required properties through the selection and deployment of different components, such as water resistance, UV protection, chemical resistance, scratch resistance, and self-healing. Therefore, as shown in FIG. 1C and FIG. 1D, the light guide plate 110 may be bent and applied to curved products or flexible products.

Referring to FIG. 6, the refractive index of the light guide substrate 112 is $n_1$. The refractive index of at least a portion of the enhancement layer 114 interposed between the first surface S1 of the light guide substrate 112 and the first optical adhesive 120 is $n_2$. The refractive index of the first optical adhesive 120 is $n_3$. The refractive index of the second optical adhesive 40 is $n_4$. The difference between the refractive index $n_1$ of the light guide substrate 112 and the refractive index $n_2$ of the at least a portion of the enhancement layer 114 is $\Delta n_1$, in which $\Delta n_1 = n_1 - n_2$. The difference between the refractive index $n_3$ of the first optical adhesive 120 and the refractive index $n_2$ of the at least a portion of the enhancement layer 114 interposed between the first surface S1 of the light guide substrate 112 and the first optical adhesive 120 is $\Delta n_2$, in which $\Delta n_2 = n_3 - n_2$. The difference between the refractive index $n_1$ of the light guide substrate 112 and the refractive index $n_4$ of the second optical adhesive 40 is $\Delta n_3$, in which $\Delta n_3 = n_1 - n_4$.

It is worth noting that $\Delta n_1 \geq 0$, $\Delta n_2 \geq 0$, and $\Delta n_1 \geq \Delta n_2$. In this way, the display DP1 can obtain better optical performance. For example, in some embodiments, $\Delta n_1 > 0$, $\Delta n_2 > 0$, and $\Delta n_1 > \Delta n_2$, but the disclosure is not limited thereto. In some embodiments, $\Delta n_1 \geq 0$, $\Delta n_2 \geq 0$, $\Delta n_3 \geq 0$, and $\Delta n_1 \geq \Delta n_3 \geq \Delta n_2$. In this way, the optical performance of the display DP1 can be optimized. For example, in some embodiments, $\Delta n_1 > 0$, $\Delta n_2 > 0$, $\Delta n_3 > 0$, and $\Delta n_1 > \Delta n_3 > \Delta n_2$, but the disclosure is not limited thereto.

In FIG. 6, the light guide plate 110 includes the light guide substrate 112 and the enhancement layer 114. The light guide plate 110 has a first optical surface 110a, a second optical surface 110b, an optical side surface 110c, and an internal interface 110d. The first optical surface 110a is opposite to the second optical surface 110b, the optical side surface 110c extends between the first optical surface 110a and the second optical surface 110b, at least a portion of the optical side surface 110c may be used as the light incident surface of the light guide plate 110, the internal interface 110d is the interface between the light guide substrate 112 and the at least a portion of the enhancement layer 114 interposed between the first surface S1 of the light guide substrate 112 and the first optical adhesive 120, and at least one of the first optical surface 110a, the second optical surface 110b, the optical side surface 110c, and the internal interface 110d may have a plurality of optical microstructures. In some embodiments, the size of an optical microstructure may be less than 100 μm. For example, in some embodiments, the optical microstructure may be a dot-shaped structure, a linear structure, or a structure of other shapes. In some embodiments, the length of the linear structure may be smaller than the width of a display area of the display panel 10.

Table 1 lists the components of a display of a comparative example and the refractive index of the components. Table 1 further lists the components of the display DP1 in the embodiment of FIG. 6 and the refractive index of the components. It can be proved from the data in Table 1 that compared with the display of the comparative example, the brightness, contrast (when the front light source turns on) and color performance (when the front light source turns on) of the display DP1 of the embodiment of FIG. 6 are greatly improved.

TABLE 1

| | a display of a comparative example | the display DP1 of the embodiment |
|---|---|---|
| the cover plate 30 and the touch panel 20 | present | present |
| the first optical adhesive 120 | present ($n_3$ = 1.48) | present ($n_3$ = 1.48) |
| the enhancement layer 114 | non-present | present ($n_2$ = 1.38) |
| the light guide substrate 112 | presents($n_1$ = 1.58) | present ($n_1$ = 1.58) |
| the second optical adhesive 40 | present ($n_4$ = 1.48) | present ($n_4$ = 1.48) |
| the display panel 10 | present | present |
| brightness (any unit) | 81.7 | 114.7 |
| contrast (when the front light source turns on) | 13.8 | 16.2 |
| color performance (when the front light source turns on) | 9425 | 14704 |
| contrast (when the front light source turns off) | 11.9 | 11.9 |
| color performance (when the front light source turns off) | 3409 | 3553 |

Figure 7:
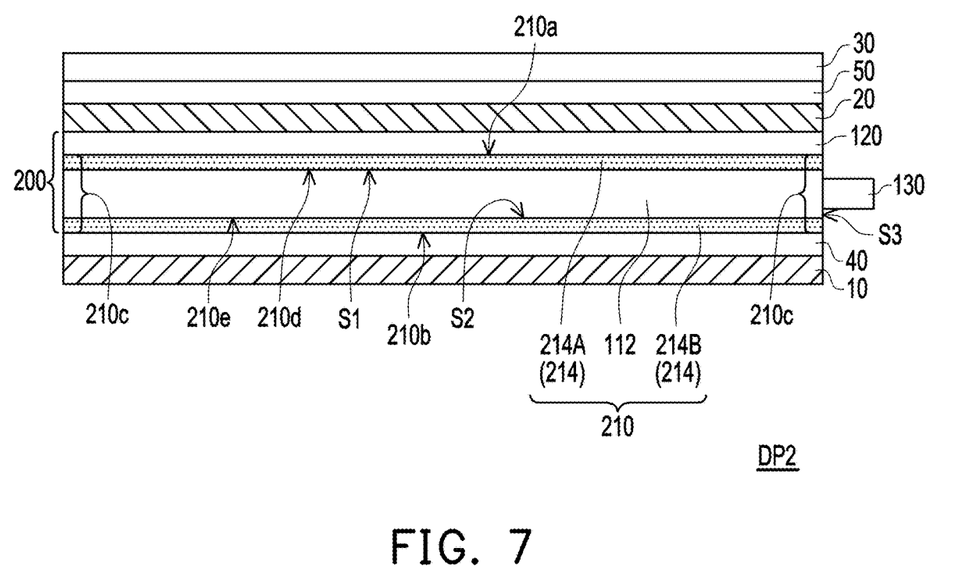
FIG. 7 is a schematic side view of a display according to an embodiment of the disclosure.

FIG. 7 is a schematic side view of a display according to an embodiment of the disclosure. In FIG. 7, a display DP2 mainly includes the light guide plate 210, the first optical adhesive 120, the light source element 130, the display panel 10, the touch panel 20, the cover plate 30, the second optical adhesive 40, and the third optical adhesive 50. The display DP2 is substantially the same as the display DP1, so the descriptions of the same elements in the two embodiments may be referred to each other. Specifically, the display DP2 is different from the display DP1 in that, the display DP2 uses the light source device 200 formed by the light guide plate 210, the first optical adhesive 120, and the light source element 130 as the light source of the display panel 10. The light source device 200 is disposed between the display panel 10 and the touch panel 20. For the descriptions of the specific structure and design of the light source device 200, reference may be made to the relevant description in FIG. 2, so details will not be repeated here. In addition, in some embodiments, the light guide plate 210 may be implemented using the light guide plate 210' in FIG. 5. Specifically, the light guide plate 210 of the light source device 200 includes the light guide substrate 112 and the enhancement layer 214, and the enhancement layer 214 includes the first sub-layer 214A and the second sub-layer 214B covering different surfaces of the light guide substrate 112. The first sub-layer 214A covers the first surface S1 of the light guide substrate 112. The second sub-layer 214B covers the second surface S2 of the light guide substrate 112. In this way, the first optical adhesive 120 used to attach the touch panel 20 to the light guide plate 210 is disposed on the first sub-layer 214A, the second optical adhesive 40 used to attach the display panel 10 to the light guide plate 210 is disposed on the second sub-layer 214B, and the display panel 10 is attached to the second sub-layer 214B of the enhancement layer 214 through the second optical adhesive 40. In this way, the enhancement layer 214 is interposed between the first surface S1 of the light guide substrate 112 and the first optical adhesive 120, and also interposed between the second surface S2 of the light guide substrate 112 and the display panel 10.

Referring to FIG. 7, the refractive index of the light guide substrate 112 is $n_1$. At least a portion of the enhancement layer 214 interposed between the first surface S1 of the light guide substrate 112 and the first optical adhesive 120 is the first sub-layer 214A. The refractive index of the first sub-layer 214A of the enhancement layer 214 is $n_2$. The refractive index of the first optical adhesive 120 is $n_3$. The refractive index of the second optical adhesive 40 is $n_4$. The refractive index of the second sub-layer 214B of the enhancement layer 214 is $n_5$. The difference between the refractive index $n_1$ of the light guide substrate 112 and the refractive index $n_2$ of the first sub-layer 214A of the enhancement layer 214 is $\Delta n_1$, in which $\Delta n_1 = n_1 - n_2$. The difference between the refractive index $n_3$ of the first optical adhesive 120 and the refractive index $n_2$ of the first sub-layer 214A of the enhancement layer 214 is $\Delta n_2$, in which $\Delta n_2 = n_3 - n_2$. The difference between the refractive index $n_1$ of the light guide substrate 112 and the refractive index $n_5$ of the second sub-layer 214B of the enhancement layer 214 is $\Delta n_4$, in which $\Delta n_4 = n_1 - n_5$. The difference between the refractive index of the second optical adhesive 40 and the refractive index of the second sub-layer 214B of the enhancement layer 214 is $\Delta n_5$, in which $\Delta n_5 = n_4 - n_5$.

It is worth noting that $\Delta n_1 \geq 0$, $\Delta n_2 \geq 0$, and $\Delta n_1 \geq \Delta n_2$. In this way, the display DP2 can obtain better optical performance. In some embodiments, $\Delta n_1 \geq 0$, $\Delta n_2 \geq 0$, $\Delta n_4 \geq 0$, $\Delta n_5 \geq 0$, and $\Delta n_1 \geq \Delta n_4 \geq \Delta n_2 \geq \Delta n_5$. In this way, the optical performance of the display DP2 can be optimized. For example, in some embodiments, $\Delta n_1 > 0$, $\Delta n_2 > 0$, $\Delta n_4 > 0$, $\Delta n_5 > 0$, and $\Delta n_1 > \Delta n_4 > \Delta n_2 > \Delta n_5$, but the disclosure is not limited thereto.

In FIG. 7, the light guide plate 210 includes the light guide substrate 112, the first sub-layer 214A, and the second sub-layer 214B of the enhancement layer 214. The light guide plate 210 has a first optical surface 210a, a second optical surface 210b, an optical side surface 210c, a first internal interface 210d, and a second internal interface 210e. The first optical surface 210a is opposite to the second optical surface 210b, the optical side surface 210c extends between the first optical surface 210a and the second optical surface 210b, at least a portion of the optical side surface 210c may be used as the light incident surface of the light guide plate 210, the first internal interface 210d is the interface between the light guide substrate 112 and the first sub-layer 214A of the enhancement layer 214, the second internal interface 210e is the interface between the light guide substrate 112 and the second sub-layer 214B of the enhancement layer 214, and at least one of the first optical surface 210a, the second optical surface 210b, the optical side surface 210c, the first internal interface 210d, and the second internal interface 210e may have a plurality of optical microstructures. In some embodiments, the size of an optical microstructure may be less than 100 μm. For example, in some embodiments, the optical microstructure may be a dot-shaped structure, a linear structure, or a structure of other shapes. In some embodiments, the length of the linear structure may be smaller than the width of the display area of the display panel 10.

Table 2 lists the components of a display of a comparative example and the refractive index of the components. Table 2 further lists the components of the display DP2 in the embodiment of FIG. 7 and the refractive index of the components. It can be proved from the data in Table 2 that compared with the display of the comparative example, the brightness, contrast (when the front light source turns on) and color performance (when the front light source turns on) of the display DP2 of the embodiment in FIG. 7 are greatly improved.

TABLE 2

|  | a display of a comparative example | the display DP2 of the embodiment |
|---|---|---|
| the cover plate 30 and the touch panel 20 | present | present |
| the first optical adhesive 120 | present($n_3$ = 1.41) | present ($n_3$ = 1.41) |
| the first sub-layer 214A | non-present | present ($n_2$ = 1.38) |
| the light guide substrate 112 | present ($n_1$ = 1.55) | present ($n_1$ = 1.55) |
| the second sub-layer 214B | non-present | present ($n_5$ = 1.38) |
| the second optical adhesive 40 | present($n_4$ = 1.41) | present ($n_4$ = 1.41) |
| the display panel 10 | present | present |
| brightness (any unit) | 81.7 | 110 |
| contrast (when the front light source turns on) | 10.8 | 12.3 |
| color performance (when the front light source turns on) | 46k | 57k |
| contrast (when the front light source turns off) | 11.9 | 13.6 |
| color performance (when the front light source turns off) | 5227 | 6305 |

Figure 8:
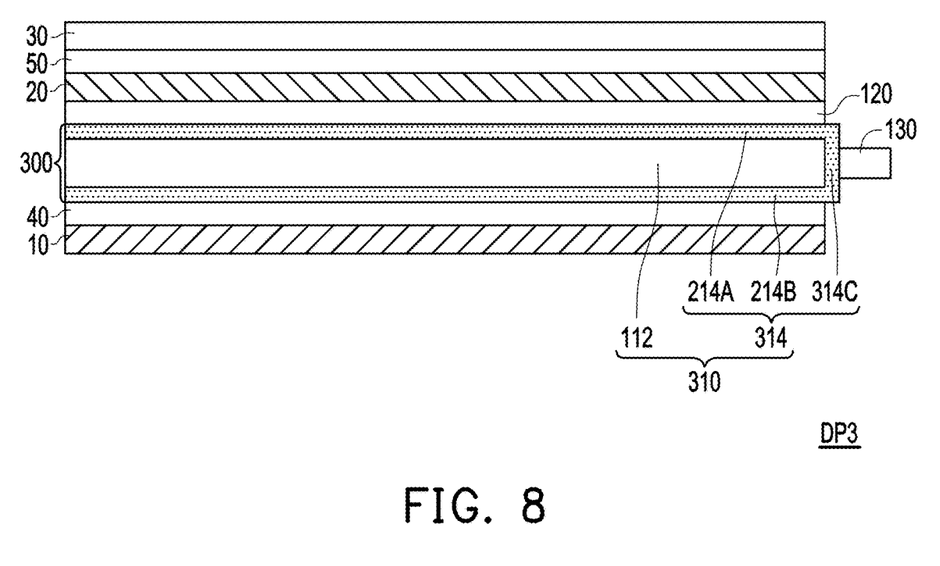
FIG. 8 is a schematic side view of a display according to an embodiment of the disclosure.

FIG. 8 is a schematic side view of a display according to an embodiment of the disclosure. In FIG. 8, a display DP3 mainly includes a light guide plate 310, the first optical adhesive 120, the light source element 130, the display panel 10, the touch panel 20, the cover plate 30, and other second optical adhesive 40 and third optical adhesive 50. The display DP3 is substantially the same as the display DP1, so the descriptions of the same elements in the two embodiments may be referred to each other. Specifically, the display DP3 is different from the display DP1 in that, the display DP3 uses the light source device 300 formed by the light guide plate 310, the first optical adhesive 120, and the light source element 130 as the light source of the display panel 10. Specifically, the light source device 300 includes the light guide plate 310, the first optical adhesive 120, and the light source element 130, in which the light guide plate 310 includes the light guide substrate 112 and the enhancement layer 314, and the enhancement layer 314 includes the first sub-layer 214A covering the first surface S1, the second sub-layer 214B covering the second surface S2, and the third sub-layer 314C covering the light incident surface S3. For the descriptions of the specific structure and design of the light source device 300, reference may be made to the relevant descriptions in FIG. 3A and FIG. 3B, so details will not be repeated here. In addition, in some embodiments, the light guide substrate 112 may be implemented using the light guide substrate 112' in FIG. 5.

In summary, the light source device and the display according to the embodiments of the disclosure have the light guide plate with the composite design. The light guide plate of the embodiments includes the light guide substrate and the enhancement layer. The material selection of the enhancement layer may achieve different functions such as water resistance, UV protection, chemical resistance, scratch resistance, and self-healing. Therefore, the light guide plate of the embodiments is advantageous for application in different products. The enhancement layer may be used as the intermediary layer between the light guide substrate and the first optical adhesive, which can stabilize the bonding between components without increasing the thickness of the overall product. The enhancement layer may also be used as the intermediary layer between the light guide substrate and the light source element to help evenly distribute the light emitted by the light source element in the light guide plate, which helps improve the uniform lighting of the light-emitting device and improve the display quality of the display.

What is claimed is:

1. A display, comprising:
a light guide plate comprising:
a light guide substrate having a light incident surface, a first surface, and a second surface, wherein the first surface is opposite to the second surface, and the light incident surface extends between the first surface and the second surface; and
an enhancement layer disposed on the light guide substrate;
a first optical adhesive disposed on the light guide substrate, wherein at least a portion of the enhancement layer is interposed between the first surface of the light guide substrate and the first optical adhesive;
a light source element arranged next to the light incident surface and emitting light toward the light incident surface;
a second optical adhesive, wherein the display panel is attached to the second surface of the light guide substrate through the second optical adhesive; and
a display panel facing the second surface of the light guide substrate;
wherein a refractive index of the light guide substrate is $n_1$, a refractive index of the at least a portion of the enhancement layer is $n_2$, a refractive index of the first optical adhesive is $n_3$, and a difference between the refractive index of the light guide substrate and the refractive index of the at least a portion of the enhancement layer is $\Delta n_1$, $\Delta n_1 = n_1 - n_2$, a difference between the refractive index of the first optical adhesive and the refractive index of the at least a portion of the enhancement layer is $\Delta n_2$, $\Delta n_2 = n_3 - n_2$, $\Delta n_1 \geq 0$, $\Delta n_2 \geq 0$, and $\Delta n_1 \geq \Delta n_2$,
wherein a refractive index of the second optical adhesive is $n_4$, a difference between the refractive index of the light guide substrate and the refractive index of the second optical adhesive is $\Delta n_3$, $\Delta n_3 = n_1 - n_4$, $\Delta n_3 \geq 0$, and $\Delta n_1 \geq \Delta n_3 \geq \Delta n_2$.

2. The display as claimed in claim 1, wherein $\Delta n_1 > 0$, and $\Delta n_2 > 0$.

3. The display as claimed in claim 1, wherein $\Delta n_1 > \Delta n_2$.

4. The display as claimed in claim 1, wherein $\Delta n_1 > 0$, $\Delta n_2 > 0$, and $\Delta n_3 > 0$.

5. The display as claimed in claim 1, wherein $\Delta n_1 > \Delta n_3 > \Delta n_2$.

6. The display as claimed in claim 1, wherein an optical element comprises the light guide substrate and the enhancement layer, the optical element has a first optical surface, a second optical surface, an optical side surface, and an internal interface, the first optical surface is opposite to the second optical surface, the optical side surface extends between the first optical surface and the second optical surface, the internal interface is an interface between the light guide substrate and the enhancement layer, and at least one of the first optical surface, the second optical surface, the optical side surface, and the internal interface has a plurality of optical microstructures.

7. The display as claimed in claim 1, wherein the enhancement layer comprises:
   a first sub-layer covering the first surface of the light guide substrate, wherein the at least a portion of the enhancement layer is the first sub-layer, and a refractive index of the first sub-layer is $n_2$; and
   a second sub-layer covering the second surface of the light guide substrate, wherein a refractive index of the second sub-layer is $n_5$;
   a difference between the refractive index of the light guide substrate and the refractive index of the second sub-layer of the enhancement layer is $\Delta n_4$, $\Delta n_4 = n_1 - n_5$, $\Delta n_4 \geq 0$, and $\Delta n_1 \geq \Delta n_4 \geq \Delta n_2$.

8. The display as claimed in claim 7, wherein $\Delta n_1 > 0$, $\Delta n_2 > 0$, and $\Delta n_4 > 0$.

9. The display as claimed in claim 7, wherein $\Delta n_1 > \Delta n_4 > \Delta n_2$.

10. The display as claimed in claim 7, wherein the display panel is attached to the second sub-layer of the enhancement layer through the second optical adhesive, a difference between the refractive index of the second optical adhesive and the refractive index of the second sub-layer is $\Delta n_5$, $\Delta n_5 = n_4 - n_5$, $\Delta n_5 \geq 0$, and $\Delta n_1 \geq \Delta n_4 \geq \Delta n_2 \geq \Delta n_5$.

11. The display as claimed in claim 10, wherein $\Delta n_1 > 0$, $\Delta n_2 > 0$, $\Delta n_4 > 0$, and $\Delta n_5 > 0$.

12. The display as claimed in claim 10, wherein $\Delta n_1 > \Delta n_4 > \Delta n_2 > \Delta n_5$.

13. The display as claimed in claim 10, wherein an optical element comprises the light guide substrate, the first sub-layer of the enhancement layer, and the second sub-layer of the enhancement layer, the optical element has a first optical surface, a second optical surface, an optical side surface, a first internal interface, and a second internal interface, the first optical surface is opposite to the second optical surface, the optical side surface extends between the first optical surface and the second optical surface, the first internal interface is an interface between the light guide substrate and the first sub-layer, the second internal interface is an interface between the light guide substrate and the second sub-layer, and at least one of the first optical surface, the second optical surface, the optical side surface, the first internal interface, and the second internal interface has a plurality of optical microstructures.

14. A front light module, comprising:
    a light guide plate comprising:
       a light guide substrate having a light incident surface, a first surface, and a second surface, wherein the first surface is opposite to the second surface, and the light incident surface extends between the first surface and the second surface; and
       an enhancement layer disposed on the light guide substrate; and
    a first optical adhesive disposed on the light guide substrate, wherein at least a portion of the enhancement layer is interposed between the first surface of the light guide substrate and the first optical adhesive;
    a second optical adhesive disposed on the second surface of the light guide substrate;
    wherein a refractive index of the light guide substrate is $n_1$, a refractive index of the at least a portion of the enhancement layer is $n_2$, a refractive index of the first optical adhesive is $n_3$, a difference between the refractive index of the light guide substrate and the refractive index of the at least a portion of the enhancement layer is $\Delta n_1$, $\Delta n_1 = n_1 - n_2$, a difference between the refractive index of the first optical adhesive and the refractive index of the at least a portion of the enhancement layer is $\Delta n_2$, $\Delta n_2 = n_3 - n_2$, $\Delta n_1 \geq 0$, $\Delta n_2 \geq 0$, and $\Delta n_1 \geq \Delta n_2$,
    wherein a refractive index of the second optical adhesive is $n_4$, a difference between the refractive index of the light guide substrate and the refractive index of the second optical adhesive is $\Delta n_3$, $\Delta n_3 = n_1 - n_4$, $\Delta n_3 \geq 0$, and $\Delta n_1 \geq \Delta n_3 \geq \Delta n_2$.

15. The front light module as claimed in claim 14, wherein the enhancement layer is formed on the light guide substrate through a coating process, and a thickness of the enhancement layer is smaller than a thickness of the light guide substrate.

16. A front light module, comprising:
    a light guide plate, comprising:
       a light guide substrate having a light incident surface, a first surface, and a second surface, wherein the first surface is opposite to the second surface, and the light incident surface extends between the first surface and the second surface; and
       an enhancement layer disposed on the light guide substrate;
    a first optical adhesive disposed on the light guide substrate, wherein at least a portion of the enhancement layer is interposed between the first surface of the light guide substrate and the first optical adhesive; and
    wherein, a refractive index of the light guide substrate is $n_1$, a refractive index of the at least a portion of the enhancement layer is $n_2$, a refractive index of the first optical adhesive is $n_3$, $\Delta n_1 > \Delta n_3 > \Delta n_2$, a thickness of the enhancement layer is less than a thickness of the light guide substrate, and the thickness of the enhancement layer is less than a thickness of the first optical adhesive.

* * * * *